United States Patent
Bohres et al.

(10) Patent No.: US 7,342,140 B2
(45) Date of Patent: Mar. 11, 2008

(54) METHOD FOR THE PRODUCTION OF POLYETHEROLS

(75) Inventors: Edward Bohres, Mannheim (DE); Hartmut Hibst, Schriesheim (DE); Michael Stoesser, Neuhofen (DE); Raimund Ruppel, Dresden (DE); Eva Baum, Schwarzheide (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 428 days.

(21) Appl. No.: 10/526,937

(22) PCT Filed: Sep. 11, 2003

(86) PCT No.: PCT/EP03/10109

§ 371 (c)(1),
(2), (4) Date: Mar. 8, 2005

(87) PCT Pub. No.: WO2004/026939

PCT Pub. Date: Apr. 1, 2004

(65) Prior Publication Data

US 2005/0245770 A1   Nov. 3, 2005

(30) Foreign Application Priority Data

Sep. 12, 2002   (DE) ................. 102 42 399

(51) Int. Cl.
*C07C 43/00* (2006.01)
(52) U.S. Cl. .............. 568/618; 568/619; 568/620
(58) Field of Classification Search ............... 568/618, 568/619, 620
See application file for complete search history.

(56) References Cited

U.S. PATENT DOCUMENTS 6,429,342 B1 *   8/2002   Clement et al. ............ 568/616

FOREIGN PATENT DOCUMENTS

| EP | 0 516 017 | 12/1992 |
|---|---|---|
| EP | 1 002 821 | 5/2000 |
| WO | 99/44739 | 9/1999 |

* cited by examiner

*Primary Examiner*—Porfirio Nazario-Gonzalez
(74) *Attorney, Agent, or Firm*—Oblon, Spivak, McClelland, Maier & Neustadt, P.C.

(57) ABSTRACT

The present invention relates to a process for preparing a polyetherol which comprises reacting at least one alkylene oxide with at least one starter compound in the presence of a catalyst of the formula I:

$$M^1_p[M^2_qO_n(OH)_{2(3-n)}]_x, \qquad (I)$$

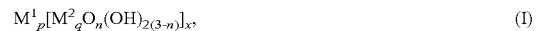

and to the polyetherols prepared by such a process and to their use for the synthesis of polyurethanes, as fuel additive or as surfactant.

7 Claims, No Drawings

METHOD FOR THE PRODUCTION OF POLYETHEROLS

The present invention relates to a process for preparing a polyetherol which comprises reacting at least one alkylene oxide with at least one starter compound in the presence of a multimetal oxide catalyst, and also to the polyetherols prepared by such a process, in particular polypropylene glycol or polyethylene glycol, and to their use for the synthesis of polyurethanes, as fuel additive or as surfactant.

Depending on the starter compounds and alkylene oxides used, polyetherols can be used for a variety of applications. In the synthesis of polyurethanes, in particular, bifunctional or polyfunctional polyetherols play an important role as starting materials.

Methods of synthesizing polyetherols using various catalysts are known in principle from the prior art. Thus, for example, WO 99/44739 describes the use of supported double metal cyanide catalysts for the synthesis of polyether alcohols from alkylene oxides and suitable starter compounds.

Use of other catalysts for such processes is also described in the prior art. Thus, for example, EP-A 1 002 821 describes metal antimonates and processes for preparing polyether polyols using such catalysts. The catalysts disclosed in EP-A 1 002 821 are, in particular, antimonates of alkaline earth metals, metals of groups IIA, IIIA, VA of the Periodic Table of the Elements or transition metals of groups IIB, IIIB, VB and VIIIB. Furthermore, the reaction of water or polyfunctional alcohols with an alkylene oxide in the presence of these antimonates as catalyst to form polyether polyols is described.

The metal-antimony oxide hydroxides described there as catalyst have a comparatively high hydroxide content. This can lead to chemical instability at elevated temperatures in the polyetherol synthesis. Furthermore, the catalysts described there have a comparatively low specific BET surface area, which leads to a reduced catalytic activity.

It is an object of the present invention to provide, starting from the prior art, a further process for preparing polyetherols using catalysts which are more stable at elevated temperature.

We have found that this object is achieved by a process for preparing a polyetherol which comprises reacting at least one alkylene oxide with at least one starter compound in the presence of a catalyst, wherein the catalyst used is a multimetal oxide compound of the formula I:

(I), where
$M^1$ is at least one element of groups IA, IIA, IIIA, IVA, VA, IB, IIB, IIIB, IVB, VB, VIB, VIIB and/or VIIIB of the Periodic Table of the Elements,
$M^2$ is at least one element of groups IVA, VA and/or VIA of the Periodic Table of the Elements,
n is a fraction or integer from 2 to 3, in particular from greater than 2 to 3,
p is 0 or a fraction or integer greater than 0,
q is a fraction or integer greater than 0 and
x is a fraction or integer from 1 to 20.

According to the present invention, the metal $M^1$ is at least one element of one of the groups IA, IIA, IIIA, IVA, VA, IB, IIB, IIIB, IVB, VB, VIB, VIIB and/or VIIIB of the Periodic Table of the Elements. In particular, the metal $M^1$ is selected from the group consisting of aluminum, tin, magnesium, titanium, zirconium, cadmium, lanthanum and zinc, particularly preferably zinc and aluminum. The metal $M^2$ is at least one element of groups IVA, VA and/or VIA of the Periodic Table of the Elements. $M^2$ is preferably selected from the group consisting of arsenic, antimony, bismuth, tin, germanium, selenium and tellurium, particularly preferably arsenic, antimony or arsenic and antimony, in particular antimony.

The catalysts used according to the present invention thus have an OH/O ratio of from 0 to 1, in particular from 0 to less than 1. As a result of the comparatively small proportion of OH groups, the multimetal oxide compounds used as catalyst have an improved thermal stability.

Such multimetal oxide compounds can be prepared inexpensively, for example from simple starting compounds of the metals $M^1$ and $M^2$, e.g. salts, oxide hydroxides, or oxides of the metals $M^1$ and $M^2$. In principle, it is possible to use all suitable salts known to those skilled in the art, in particular water-soluble salts such as chlorides, acetates, nitrates or acetylacetonates. The multimetal oxide compounds used according to the present invention as catalyst are preferably prepared from a salt of the metal $M^1$ and an oxide, oxide hydroxide or hydroxide of the metal $M^2$.

These simple starting compounds of the metals $M^1$ and $M^2$ can, in particular, be reacted either in a solid-state reaction, for example by means of calcination, or in solution or in suspension in a solvent, in particular in water. It can also be advantageous to use the metal $M^2$ initially in a lower oxidation state and to oxidize this to the desired oxidation state before or during the reaction with the salt of the metal $M^1$.

The reaction of the starting compounds in the preparation of the catalyst in the presence of a solvent is preferably carried out at elevated temperatures, in general above 40° C., for example at least 60° C., preferably at least 70° C., in particular at least 80° C. or at least 90° C. The suspension obtained in this case can be freed of the solvent. Drying can be carried out, for example, by means of spray drying. However, it is likewise possible to dry the catalyst by means of freeze drying or conventional drying, i.e., for example, by filtration or centrifugation, washing and subsequent drying, for example at elevated temperature. The product obtained is then preferably calcined. The calcination step is preferably carried out at from 100° C. to 700° C., for example from 200° C. to 650° C., preferably from 200 to ≦200° C., particularly preferably from 250 to ≦580° C., frequently ≦550° C. In general, calcination is carried out for a period of from 10 minutes to a number of hours. The calcination can generally be carried out inert gas or under a mixture of inert gas and oxygen, e.g. air, or else under pure oxygen. Calcination under a reducing atmosphere is also possible. In general, the calcination time required decreases with increasing calcination temperature.

Multimetal oxide compounds having $M^2$=antimony which are suitable as catalyst in the process of the present invention are described, for example, in WO 99/51341 and DE-A 24 07 677, whose relevant contents are fully incorporated by reference.

Antimonates of the formula I in which $M^2$ is antimony have been found to be particularly useful in the process of the present invention.

The multimetal oxide compounds are obtainable, for example, by the methods described in detail in DE-A 24 076 77.

If $M^2$ in the formula I is antimony, preference is given to a procedure in which antimony trioxide and/or $Sb_2O_4$ is oxidized in an aqueous medium by means of hydrogen peroxide in an amount which is equal to or above the stoichiometric amount at from 40 to 100° C. to form antimony(V) oxide hydroxide hydrate, aqueous solutions and/or suspensions of suitable starting compounds of the remaining elemental constituents of the multimetal oxide compounds are added before this oxidation, during this oxidation and/or after this oxidation, $NH_3$ is added if appropriate, the mixture is subsequently stirred for a definite time at from 40 to 100° C. if appropriate, the resulting aqueous mixture is then dried, preferably spray dried at an inlet temperature of from 200 to 600° C. and an outlet temperature of from 80 to 150° C., and the intimate dry mixture is then calcined as described. Addition of $NH_3$ enables the pH of the reaction mixture to be altered. In many cases, it can be advantageous to add a stoichiometric amount of $NH_3$ based on the amount of the metal salt, but this is not absolutely necessary.

In the above-described process, it is possible to use, for example, aqueous hydrogen peroxide solutions having an $H_2O_2$ content of from 5 to 33 or more % by weight. A subsequent addition of suitable starting compounds of the remaining elemental constituents of the multimetal oxide compounds is advisable particularly when these can result in catalytic decomposition of the hydrogen peroxide. Of course, it would also be possible to isolate the resulting antimony(V) oxide hydroxide hydrate from the aqueous medium and, for example, intimately mix it dry with suitable finely divided starting compounds of the remaining elemental constituents of the multimetal oxide compounds and subsequently calcine this intimate mixture as described.

After calcination is complete, the multimetal oxide compounds can be comminuted once again, for example by wet or dry milling, e.g. in a ball mill or by means of jet milling.

A preferred method of preparing the multimetal oxide compounds is firstly to convert antimony trioxide and/or $Sb_2O_4$ in an aqueous medium into a, preferably finely divided, Sb(V) compound, e.g. Sb(V) oxide hydroxide hydrate, by means of hydrogen peroxide, admix the resulting aqueous mixture with an ammoniacal aqueous solution of a water-soluble salt, for example an acetate, of the metal $M^1$, stir the resulting aqueous mixture for a further period and dry it, e.g. by spray drying as described, and calcine the resulting powder as described, if desired after subsequent compounding with water and then extrusion and drying.

In a preferred embodiment, the present invention therefore provides a process for preparing a polyetherol in which $Sb_2O_3$ or $Sb_2O_4$ is used for preparing the respective multimetal oxide compound.

The multimetal oxide compounds of the formula I have particularly advantageous catalytic properties in the preparation of polyetherols.

According to the present invention, the catalyst used in the process for preparing a polyetherol is preferably a multimetal oxide compound of the formula I which has at least one of the following properties:

(1) p is an integer or fraction from 0 to 3, preferably from 0.5 to 2, in particular from 0.9 to 1.1, for example 1;
(2) q is an integer or fraction from greater than 0.5 to 3, preferably from 0.7 to 2, in particular from 0.9 to 1.1, for example 1;
(3) x is an integer or fraction from 1.2 to 14, preferably from 1.4 to 7, in particular from 1.6 to 5, for example from 1.8 to 3.2;
(4) the metal $M^2$ is antimony and/or arsenic;
(5) the metal $M^1$ is selected from the group consisting of aluminum, tin, magnesium, titanium, zirconium, cadmium, lanthanum and zinc; and
(6) n is an integer or fraction from 2 to 3, preferably from greater than 2 to 3.

In a specific embodiment, the present invention provides a process for preparing a polyetherol in which the catalyst used is a multimetal oxide compound of the formula I which has at least one of the following properties:

(1') p is 1;
(2') q is 1;
(3') x is an integer or fraction from 1.8 to 3.2;
(4') the metal $M^2$ is antimony;
(5') the metal $M^1$ is selected from the group consisting of zinc and aluminum; and
(6') n is an integer or fraction from greater than 2 to 3.

It is likewise possible in the context of the present invention for the multimetal oxide compound used as catalyst to have two or more of the properties (1') to (6'). In particular, a multimetal oxide compound used as catalyst in the process of the present invention can have all of the properties (1') to (6').

In a particularly preferred embodiment, the present invention provides a process in which the catalyst used has the formula $Zn[SbO_n(OH)_{2(3-n)}]_2$ or $Al[SbO_n(OH)_{2(3-n)}]_3$, where n is an integer or fraction from 2 to 3, preferably from greater than 2 to 3.

In a preferred embodiment, the present invention provides a process for preparing a polyetherol in which the metal $M^1$ is zinc or aluminum.

In general, the multimetal oxide compound used as catalyst in a process of the present invention is present essentially in crystalline form. I.e. the multimetal oxide compound generally consists essentially of small crystallites whose maximum dimension is typically from 0.05 to 100 μm. Of course, however, the multimetal oxide compound can also be amorphous and/or crystalline.

Suitable multimetal oxide compounds have, for example, a crystal structure which is isotypic with the structure of the mineral partzite, i.e. $Cu_2Sb_2(O,OH)_7$. The present invention therefore also provides a process for preparing a polyetherol in which the multimetal oxide compound of the formula I has a crystal structure which is isotypic with the structure of the mineral partzite.

The catalytic activity of the multimetal oxide compounds used is also, for example, dependent on the specific BET surface area of the compounds. The specific BET surface are determined by the method of Brunauer, Emmett and Teller is influenced, for example, by the calcination temperature. The multimetal oxide compounds used in the process of the present invention have, for example, a specific BET surface area of from 15 to 500 $m^2/g$, preferably from 20 to 200 $m^2/g$, in particular from 20 to 150 $m^2/g$, particularly preferably from 40 to 150 $m^2/g$.

In a preferred embodiment, the present invention therefore provides a process for preparing a polyetherol in which the multimetal oxide compound of the formula I has a specific BET surface area of from 15 to 500 $m^2/g$.

The catalyst concentration used in the process of the present invention is less than 5.0% by weight based on the product, preferably less than 2.0% by weight, in particular less than 1.5% by weight, particularly preferably less than 1.0% by weight. According to the present invention, the catalyst can, for example, be used as a suspension or as a fixed-bed catalyst.

As starter compounds in the process of the present invention, it is possible to use all the suitable compounds containing active hydrogen which are known to those skilled in the art. According to the present invention, preference is given to using OH-functional starter compounds, for example OH-monofunctional or OH-polyfunctional compounds.

In a further embodiment, the present invention therefore provides a process for preparing a polyetherol in which the starter compound is an OH-monofunctional or OH-polyfunctional compound.

Examples of starter compounds which are suitable for the purposes of the present invention are the following compounds: water, organic dicarboxylic acids such as succinic acid, adipic acid, phthalic acid and terephthalic acid, aliphatic and aromatic, unsubstituted or N-monoalkyl-, N,N-dialkyl- and N,N'-dialkyl-substituted diamines having from 1 to 4 carbon atoms in the alkyl radical, e.g. unsubstituted, monoalkyl-substituted and dialkyl-substituted ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine, phenylenediamines, 2,3-, 2,4- and 2,6-toluenediamine and 4,4'-, 2,4'- and 2,2'-diaminodiphenylmethane. Further possible starter molecules are: alkanolamines such as ethanolamine, N-methylethanolamine and N-ethylethanolamine, dialkanolamines such as diethanolamine, N-methyldiethanolamine and N-ethyl-diethanolamine, and trialkanolamines such as triethanolamine, and ammonia and also monohydric or polyhydric alcohols such as monoethylene glycol, 1,2- and 1,3-propanediol, diethylene glycol, dipropylene glycol, 1,4-butanediol, 1,6-hexanediol, glycerol, trimethylolpropane, pentaerythritol, sorbitol and sucrose. Preferred polyether alcohols are addition products of ethylene oxide and/or propylene oxide onto water, monoethylene glycol, diethylene glycol, 1,2-propanediol, dipropylene glycol, glycerol, trimethylolpropane, ethylenediamine, triethanolarnine, pentaerythritol, sorbitol and/or sucrose, either individually or as mixtures.

The starter compounds can, according to the present invention, also be used in the form of alkoxylates, in particular those having a molecular weight $M_w$ in the range from 62 to 15000 g/mol.

However, macromolecules having functional groups containing active hydrogen atoms, for example hydroxyl groups, are likewise suitable, in particular those mentioned in WO 01/16209.

Particularly preferred starter compounds are monofunctional or polyfunctional alcohols having from 1 to 24 carbon atoms, according to the present invention particularly preferably starter compounds having from 8 to 15 carbon atoms, in particular from 10 to 15 carbon atoms, for example tridecanol.

Alcohols which are particularly useful for the purposes of the present invention are thus, in particular, octanol, nonanol, decanol, undecanol, dodecanol, tridecanol, tetradecanol, pentadecanol, ethylhexanol, propylheptanol, fatty alcohols having from 10 to 18 carbon atoms, oxo alcohols, isooctanol, isononanol, isodecanol, isoundecanol, isododecanol, isotridecanol, isotetradecanol, isopentadecanol, preferably isodecanol, 2-propylheptanol, tridecanol, isotridecanol or mixtures of C13 to C15 alcohols.

In a further preferred embodiment, the present invention therefore provides a process for preparing a polyetherol in which the starter compound is a monofunctional or polyfunctional alcohol having from 1 to 24 carbon atoms.

In the process of the present invention, it is in principle possible to use all suitable epoxides. Suitable epoxides include, for example, $C_2$-$C_{20}$-alkylene oxides such as ethylene oxide, propylene oxide, 1,2-butylene oxide, 2,3-butylene oxide, isobutylene oxide, pentene oxide, hexene oxide, cyclohexene oxide, styrene oxide, dodecene epoxide, octa-decene epoxide and mixtures of these epoxides. Ethylene oxide, propylene oxide, 1,2-butylene oxide, 2,3-butylene oxide and pentene oxide are especially useful, with particular preference being given to ethylene oxide, propylene oxide, 1,2-butylene oxide, 2,3-butylene oxide and isobutylene oxide.

In a preferred embodiment, the present invention therefore provides a process for preparing a polyetherol in which the alkylene oxide is ethylene oxide, propylene oxide or butylene oxide or a mixture of two or more thereof.

According to the present invention, the alkylene oxide can also be used in the form of a mixture. A mixture can advantageously be, for example, a raffinate I oxide mixture. For the purposes of the present invention, a raffinate I oxide mixture is a mixture obtained by oxidation of a raffinate I stream.

The composition of the raffinate I oxide mixture is dependent on the raffinate stream used for its preparation. The raffinate I mixture obtained from a steam cracker comprises isobutene, 1-butene and 2-butene. This mixture can be oxidized directly to give the corresponding oxiranes as a raffinate I oxide mixture.

The use of a raffinate I oxide mixture in the process of the present invention has the advantage that the alkylene oxide mixture can be reacted essentially without prior purification and separation of the individual components. This results in a particularly inexpensive process because of the use of cheap starting materials. In a specific embodiment, the present invention therefore provides a process for preparing a polyetherol in which a raffinate I oxide mixture is reacted. The raffinate I oxide mixture can be used essentially without purification or after prior purification.

According to the present invention, the process for preparing the polyetherols is carried out at from 100° C. to 180° C., preferably from 110° C. to 150° C. The process is preferably carried out at pressures of from 0 bar to 50 bar.

The present invention likewise provides for the use of a multimetal oxide compound of the formula I as catalyst for preparing a polyetherol from at least one alkylene oxide and at least one starter compound:

$$M^1_p[M^2_qO_n(OH)_{2(3-n)}]_x \quad (I),$$

where $M^1$ is at least one element of groups IA, IIA, IIIA, IVA, VA, IB, IIB, IIIB, IVB, VB, VIB, VIIB and/or VIIIB of the Periodic Table of the Elements, $M^2$ is at least one element of groups IVA, VA and/or VIA of the Periodic Table of the Elements, n is a fraction or integer from 2 to 3, in particular from greater than 2 to 3, p is 0 or a fraction or integer greater than 0, q is a fraction or integer greater than 0 and x is a fraction or integer from 1 to 20.

Likewise, the present patent application provides polyetherols, in particular polypropylene glycol or polyethylene glycol, obtainable by a process which comprises reacting at least one alkylene oxide with at least one starter compound in the presence of a catalyst, wherein a multimetal oxide compound of the formula I is used as catalyst:

$$M^1_p[M^2_qO_n(OH)_{2(3-n)}]_x \quad (I),$$

where $M^1$ is at least one element of groups IA, IIA, IIIA, IVA, VA, IB, IIB, IIIB, IVB, VB, VIB, VIIB and/or VIIIB of the Periodic Table of the Elements, $M^2$ is at least one element of groups IVA, VA and/or VIA of the Periodic Table of the Elements, n is a fraction or integer from 2 to 3, in particular from greater than 2 to 3, p is 0 or a fraction or integer greater than 0, q is a fraction or integer greater than 0 and x is a fraction or integer from 1 to 20.

The polyetherols obtained according to the present invention have, for example, a narrow molecular weight distribution and a low content of high molecular weight impurities.

Depending on the type of starter compound used and the alkylene oxide, the polyetherols of the present invention are suitable for various applications. Polyetherols obtained by reacting monofunctional starter compounds with one or more alkylene oxides are particularly useful as fuel additives or surfactants. If starter compounds having two or more active functional groups are used, the polyetherols obtained are particularly suitable for use in the synthesis of polyurethanes.

The present invention therefore also provides for the use of a polyetherol obtainable by the process of the present invention or a polyetherol obtainable using a multimetal oxide compound according to the present invention for the synthesis of polyurethanes, as fuel additive or as surfactant.

In addition, the polyetherols obtained by a process of the present invention can also be used in surface coating compositions, as concrete fluidizers, as emulsifiers or as dispersants.

The present invention is illustrated by the following examples.

EXAMPLES

1. Method of Preparing the Catalyst 583.0 g of $Sb_2O_3$ (2 mol; from Merck KGaA, Darmstadt) were suspended with stirring in 4 l of water. The suspension obtained was admixed at room temperature (25° C.) with 498.6 g of a 30% strength by weight aqueous $H_2O_2$ solution (4.4 mol of $H_2O_2$; from Merck KGaA, Darmstadt). The suspension was subsequently heated to about 100° C. over a period of 1 hour while stirring and was refluxed at this temperature for 5 hours. A solution of 438.98 g of $Zn(CH_3COO)_2 \cdot 2H_2O$ (2 mol; from Merck KGaA, Darmstadt) was added over a period of 30 minutes to the suspension which was still at 100° C., during which the temperature of the total aqueous mixture dropped to about 65° C. At this temperature, 272.0 g of a 25% strength by weight aqueous ammonia solution (4 mol) were subsequently added. The aqueous suspension was stirred for another 2 hours at 80° C. and subsequently cooled to room temperature (25° C.). The aqueous suspension was finally spray dried (inlet temperature: 365° C., outlet temperature: 110° C.). This gave a free-flowing spray-dried powder (product A).

Part of the spray-dried powder (product A) was heated to 150° C. at a heating rate of 1°/min in a rotary tube furnace (1 l capacity) while passing 10 standard l/h of air through the furnace and was maintained at this temperature for 2 hours (product B).

A further part of the spray-dried powder (product A) was heated in an analogous manner to a calcination temperature of 200° C. and maintained at this temperature for 2 hours (product C).

Portions of the product C were heated at a heating rate of 3°/min to a calcination temperature of 300° C. (product D), 400° C. (product E), 500° C. (product F), 600° C. (product G) and 700° C. (product H) and in each case maintained at the respective temperature for 2 hours.

The resulting products A to H were characterized by various methods (Table 1). X-ray diffraction studies indicated that all products (A-H) were clearly crystalline. The products A-F obtained at calcination temperatures of $\leq 500°$ C. displayed the XRD pattern 07-0303 in the JCPDS card index, demonstrating the presence of a crystal structure which is isotypic with the cubic structure of the mineral partzite [partzite=$Cu_2Sb_2(O,OH)_7$]. The XRD pattern of partzite also displays a sequence of reflections analogous to the XRD pattern of cubic $Sb_6O_{13}$ (JCPCS card index no. 33-0111). Measurement of the X-ray reflections for the products A-F obtained at calcination temperatures of $\leq 500°$ C. gave the following values:

| Reflection | d [Å] | I [%] |
| --- | --- | --- |
| 1 | 5.87 ± 0.04 | 20 ± 15 |
| 2 | 3.07 ± 0.03 | 30 ± 20 |
| 3 | 2.94 ± 0.03 | 100 |
| 4 | 2.55 ± 0.03 | 30 ± 15 |
| 5 | 2.34 ± 0.03 | 7 ± 6 |
| 6 | 1.96 ± 0.03 | 14 ± 10 |
| 7 | 1.80 ± 0.03 | 50 ± 20 |
| 8 | 1.72 ± 0.03 | 15 ± 13 |
| 9 | 1.55 ± 0.02 | 14 ± 12 |
| 10 | 1.53 ± 0.02 | 40 ± 20 |
| 11 | 1.47 ± 0.02 | 12 ± 10 |

On the other hand, the calcination products G and H, which were obtained at temperatures of $\geq 600°$ C., displayed the XRD pattern 38-0453 and thus had the tetragonal crystal structure of anhydrous $ZnSb_2O_6$ (ordonezite).

Furthermore, the specific BET surface area of the calcination products was determined (in accordance with DIN 66 131 by gas adsorption ($N_2$) using the method of Brunauer, Emmett and Teller). The products which had been heated at from 150 to 400° C. had the same BET surface area as the uncalcined spray-dried powder (62 m²/g). As the calcination temperature increased, the specific BET surface areas decreased (cf. Table 1).

Some of the calcination products were also analyzed to determine their composition (Table 1). The measured proportions by weight of Zn, Sb (and, if present, ammonium and acetate) were used to calculate the remaining content of $O^{2-}$ and $(OH)^-$ in each of the samples. These compositions are summarized in Table 1 ("Stoichiometry from chemical analysis"). The value of n was calculated from the oxide and hydroxide contents of the zinc antimony oxides (Table 1).

When the calcination products A to H were heated from room temperature (25° C.) to 1000° C. at a heating rate of 5° C./min in air (flow rate: 70 cm³ of air/min) in a DTG-TG apparatus (Netzsch STA 429), the weight of the sample decreased as the temperature increased. In Table 1, "weight loss (DTG)" gives the values for the weight loss given by the difference between the initial weights of the samples in the DTG-TG apparatus and the weights of the samples at 1000° C. in the DTG-TG apparatus.

The calculated proportions of $O^{2-}$ and $(OH)^-$ in the products A to H calculated from the proportion by weight of Zn, Sb (and, if present, ammonium and acetate), which could be converted directly into an n value, agreed well with the weight loss of the samples observed in the DTG-TG.

2. Alkoxylation of Diols (DPG) in the Presence of a Zinc Antimonate Catalyst

2.1 Dipropylene Glycol+PO (Experiment E 243/01)

33.5 g (0.25 mol) of dipropylene glycol were mixed with 1.5 g (1% by weight based on the total batch) of zinc antimony oxide (Example 1, product H, Table 1).

The starter mixture was dewatered at 110° C. under reduced pressure (20-25 mbar) for 1.5 hours. The reaction mixture was then placed in a 300 ml pressure autoclave. After pressure testing and making inert with nitrogen, the reaction mixture was heated to 135° C. and 116 g (2.0 mol) of propylene oxide gas were introduced in portions of 50 ml by means of an ISCO precision pump. This resulted in an increase in the internal pressure in the reactor to 10-14 bar. The mixture was subsequently allowed to react further under these conditions for 10 hours. At the end of the reaction, the mixture was cooled to 50° C. With the offgas valve open, the mixture was stirred for 3 hours at 50° C., purged 3 times with nitrogen and cooled to room temperature and the mass balance was calculated from the amount of product obtained. According to the mass balance, a molar conversion of 1:1.01 (starter:PO) was achieved. The product obtained was filtered under pressure through a deep-bed filter.

The product obtained had a polydispersity of D=1.01 (measured by means of GPC), a molecular weight of $M_w$=151.7 g/mol (measured by means of GPC), an iodine number of IN(K)<1 g of iodine/100 g and a residual metal content of 12 ppm of antimony and 1 ppm of zinc.

2.2 Dipropylene Glycol+PO (Experiment E 247/01)

33.5 g (0.25 mol) of dipropylene glycol were mixed with 1.5 g (1% by weight based on the total batch) of zinc antimony oxide (Example 1, product E, Table 1). The starter mixture was dewatered at 110° C. under reduced pressure (20-25 mbar) for 1.5 hours. The reaction mixture was then placed in a 300 ml pressure autoclave. After pressure testing and making inert with nitrogen, the reaction mixture was heated to 135° C. and 116 g (2.0 mol) of propylene oxide gas were introduced in portions of 50 ml by means of an ISCO precision pump. This resulted in an increase in the internal pressure in the reactor to 15-16 bar. The mixture was subsequently allowed to react further under these conditions for 10 hours. At the end of the reaction, the mixture was cooled to 50° C. With the offgas valve open, the mixture was stirred for 3 hours at 50° C., purged 3 times with nitrogen and cooled to room temperature and the mass balance was calculated from the amount of product obtained. According to the mass balance, a molar conversion of 1:1.1 (starter:PO) was achieved. The product obtained was filtered under pressure through a deep-bed filter.

The product obtained had a polydispersity of D=1.02 (measured by means of GPC), a molecular weight of $M_w$=156.2 g/mol (measured by means of GPC), an iodine number of IN(K) of 1 g of iodine/100 g and a residual metal content of 510 ppm of antimony and <1 ppm of zinc.

2.3 Comparative Example: Dipropylene Glycol+PO (Experiment E 248/01)

33.5 g (0.25 mol) of dipropylene glycol were mixed with 1.5 g (1% by weight based on the total batch) of $ZnSb_2O_{0.48}(OH)_{11.04}$ {=$Zn[SbO_{0.24}(OH)_{2(3-0.24)}]_2$} (prepared as described in Example 1 of EP-A 1 002 821, catalyst A, BET surface area: 11.5 m²/g). The starter mixture was dewatered at 110° C. under reduced pressure (20-25 mbar) for 1.5 hours. The reaction mixture was then placed in a 300 ml pressure autoclave. After pressure testing and making inert with nitrogen, the reaction mixture was heated to 135° C. and 116 g (2.0 mol) of propylene oxide gas were introduced in portions of 50 ml by means of an ISCO precision pump. This resulted in an increase in the internal pressure in the reactor to 15 bar. The mixture was subsequently allowed to react further under these conditions for 10 hours. At the end of the reaction, the mixture was cooled to 50° C. With the offgas valve open, the mixture was stirred for 3 hours at 50° C., purged 3 times with nitrogen and cooled to room temperature and the mass balance was calculated from the amount of product obtained. According to the mass balance, a molar conversion of 1:1.8 (starter:PO) was achieved. The product obtained was filtered under pressure through a deep-bed filter.

The product obtained had a polydispersity of D=1.075 (components in the higher molecular weight range, measured by means of GPC), a molecular weight of $M_w$=181.3 g/mol (measured by means of GPC), an iodine number of IN(K) <1 g of iodine/100 g and a residual metal content of 145 ppm of antimony and 9 ppm of zinc.

TABLE 1

Zinc antimony oxides, prepared from $Sb_2O_3$

| Product | Calcination temp. [° C.] | Chem. analysis [% by wt.] Zn | Sb | $NH_4$ | $CH_3COO$ | Stoichiometry from chemical analysis | n | Weight loss from composition [%] | Weight loss (DTG) [%] | XRD pattern | specific BET surface area [m²/g] |
|---|---|---|---|---|---|---|---|---|---|---|---|
| A | none | 15.4 | 56 | 0.67 | 1.7 | $Zn[SbO_{2.52}(OH)_{2(3-2.52)}]_2$ | 2.52 | 6.4 | 6.3 | $Cu_2Sb_2(O, OH)_7$ | 62 |
| B | 150 | 15.5 | 56 | 0.57 | 1.4 | $Zn[SbO_{2.50}(OH)_{2(3-2.50)}]_2$ | 2.50 | 6.2 | 5.6 | $Cu_2Sb_2(O, OH)_7$ | 61 |
| C | 200 | 15.7 | 57 | 0.44 | 0.79 | $Zn[SbO_{2.60}(OH)_{2(3-2.60)}]_2$ | 2.60 | 4.6 | 4.2 | $Cu_2Sb_2(O, OH)_7$ | 63 |
| D | 300 | 16.0 | 59 | 0.20 | 0.02 | $Zn[SbO_{2.84}(OH)_{2(3-2.84)}]_2$ | 2.84 | 1.6 | 1.7 | $Cu_2Sb_2(O, OH)_7$ | 63 |
| E | 400 | | | | | | | | | $Cu_2Sb_2(O, OH)_7$ | 62 |
| F | 500 | 16.2 | 60 | | | $Zn[SbO_{2.98}(OH)_{2(3-2.98)}]_2$ | 2.98 | 0.13 | 1.2 | $Cu_2Sb_2(O, OH)_7$ | 58 |
| G | 600 | | | | | | | | | $ZnSb_2O_6$ | 46 |
| H | 700 | | | | | | | | | $ZnSb_2O_6$ | 1 |

We claim:

1. A process for preparing a polyetherol comprising reacting at least one alkylene oxide with at least one starter compound in the presence of a catalyst, wherein the catalyst is a multimetal oxide compound of the formula I:

$$M^1_p[M^2_q O_n(OH)_{2(3-n)}]_x \qquad (I),$$

where
- $M^1$ is at least one metal selected from the group consisting of IA, IIA, IIIA, IVA, VA, IB, IIB, IIIB, IVB, VB, VIB, VIIB and VIIIB of the Periodic Table of the Elements,
- $M^2$ is at least one element of groups IVA, VA and/or VIA of the Periodic Table of the Elements,
- n is an integer or fraction from greater than 2 to 3,
- p is 1,
- q is a fraction or integer greater than 0 and
- x is a fraction or integer from 1 to 20, wherein the multimetal oxide compound of the formula I has a specific BET surface area of from 15 to 500 m²/g.

2. The process as claimed in claim 1, wherein the catalyst is a multimetal oxide compound of the formula I which has at least one of the following properties:

(2') q is 1;
(3') x is an integer or fraction from 1.8 to 3.2;
(4') the metal $M^2$ is antimony;
(5') the metal $M^1$ is at least one selected from the group consisting of zinc and aluminum.

3. The process as claimed in claim 1, wherein the metal $M^1$ zinc or aluminum.

4. The process as claimed in claim 1, wherein the multimetal oxide compound of the formula I has a crystal structure which is isotypic with the structure of the mineral partzite.

5. The process for preparing a polyetherol as claimed in claim 1, wherein the multimetal oxide compound is prepared using $Sb_2O_3$ or $Sb_2O_4$.

6. The process for preparing a polyetherol as claimed in claim 1, wherein the starter compound is an OH-monofunctional or OH-polyfunctional compound.

7. A polyetherol obtained by a process as claimed in claim 1, having a polydispersity of 1.01-1.02.

* * * * *